United States Patent
Lallemant et al.

(10) Patent No.: US 9,518,537 B2
(45) Date of Patent: Dec. 13, 2016

(54) FLUID CIRCULATION VALVE, NOTABLY FOR A MOTOR VEHICLE, AND THERMAL CONDITIONING DEVICE COMPRISING SUCH A VALVE

(71) Applicant: Valeo Systemes de Controle Moteur, Cergy Saint Christophe (FR)

(72) Inventors: Mathieu Lallemant, Maisons-Laffitte (FR); Franck Girardon, Conflans Sainte Honorine (FR); Patrick Lebrasseur, Montagny En Vexin (FR)

(73) Assignee: Valeo Systemes de Controle Moteur, Cergy Saint Christohpe (FR)

( * ) Notice: Subject to any disclaimer, the term of this patent is extended or adjusted under 35 U.S.C. 154(b) by 83 days.

(21) Appl. No.: 14/401,129

(22) PCT Filed: May 3, 2013

(86) PCT No.: PCT/FR2013/050998
§ 371 (c)(1),
(2) Date: Nov. 14, 2014

(87) PCT Pub. No.: WO2013/171404
PCT Pub. Date: Nov. 21, 2013

(65) Prior Publication Data
US 2015/0101579 A1    Apr. 16, 2015

(30) Foreign Application Priority Data
May 15, 2012 (FR) ...................................... 12 54434

(51) Int. Cl.
*F02M 25/07*    (2006.01)
*F16K 5/04*    (2006.01)
(Continued)

(52) U.S. Cl.
CPC ...... *F02M 25/0729* (2013.01); *F02B 29/0406* (2013.01); *F02D 41/0055* (2013.01);
(Continued)

(58) Field of Classification Search
CPC .............. F02B 29/0406; F02B 29/0418; F02D 41/0055; F16K 11/0856; F16K 11/085; F16K 11/0853; F16K 5/0407; Y02T 10/121; Y10T 137/86871; F02M 25/0729; F02M 25/0796; F02M 25/0735; F02M 26/22; F02M 26/65; F02M 26/70; F02M 26/71; F02M 26/26; F02M 26/30
(Continued)

(56) References Cited

U.S. PATENT DOCUMENTS 3,471,021 A * 10/1969 Prizler ................. B01D 29/668
                                                137/625.46
4,506,697 A *  3/1985 Marchant ............ F16K 11/0856
                                                    137/240
(Continued)

FOREIGN PATENT DOCUMENTS

DE          198 60 637 A1      7/2000

OTHER PUBLICATIONS

International Search Report for corresponding International Application No. PCT/FR2013/050998, mailed Jul. 16, 2013 (2 pages).

*Primary Examiner* — Hai Huynh
(74) *Attorney, Agent, or Firm* — Osha Liang LLP

(57) ABSTRACT

The invention relates to a fluid circulation valve, notably for a motor vehicle, comprising a body (2) and a shutoff element (3) able, by rotation of said element (3) with respect to said body (2), to occupy various angular positions, said body (2) having a first (6), a second (7), a third (21) and a fourth (22) inlet/outlet. Said valve is configured so that it: —in a first of
(Continued)

said angular positions allows fluid to circulate from the first (6) to the second (7) inlet/outlet, —in a second of said angular positions allows fluid to circulate from the first (6) to the third (21) inlet/outlet, and from the fourth (22) to the second inlet/outlet (7), —in a third of said angular positions allows fluid to circulate from the first (6) to the fourth inlet/outlet (22) and from the third (21) to the second (7) inlet/outlet.

14 Claims, 4 Drawing Sheets

(51) Int. Cl.
  *F16K 11/085* (2006.01)
  *F02D 41/00* (2006.01)
  *F02B 29/04* (2006.01)

(52) U.S. Cl.
  CPC ............ *F02M 26/26* (2016.02); *F02M 26/30* (2016.02); *F02M 26/71* (2016.02); *F16K 5/0407* (2013.01); *F16K 11/085* (2013.01); *F16K 11/0853* (2013.01); *F16K 11/0856* (2013.01); *F02B 29/0418* (2013.01); *Y10T 137/86871* (2015.04)

(58) Field of Classification Search
  USPC ..... 123/568.12, 568.17, 568.18; 60/320, 324
  See application file for complete search history.

(56) References Cited

U.S. PATENT DOCUMENTS

| | | | | |
|---|---|---|---|---|
| 4,840,028 | A | * | 6/1989 | Kusuda ................. F01N 3/0256 137/597 |
| 4,972,877 | A | * | 11/1990 | Halemba ............. F16K 11/0853 137/270 |
| 5,207,246 | A | * | 5/1993 | Meyer ................. F16K 11/0856 137/625.23 |
| 7,581,533 | B1 | * | 9/2009 | Moran .................... F02B 47/08 123/568.12 |
| 7,743,816 | B2 | * | 6/2010 | Mercz .................... F16K 1/222 165/11.1 |
| 7,950,376 | B2 | * | 5/2011 | Rollet ................... F02M 25/07 123/568.12 |
| 8,129,882 | B2 | * | 3/2012 | Russberg ............ F16K 11/0853 136/205 |
| 8,365,813 | B2 | * | 2/2013 | Mercz .................... F16K 1/222 165/100 |
| 8,931,279 | B2 | * | 1/2015 | Jeske ................... F01D 17/148 137/625.46 |
| 9,121,316 | B2 | * | 9/2015 | Gerges ...................... F01N 5/02 |
| 9,404,595 | B2 | * | 8/2016 | Lallemant ........... F02B 29/0418 |
| 2008/0184974 | A1 | * | 8/2008 | Kobayashi ............ F02M 25/07 123/568.12 |
| 2015/0136259 | A1 | * | 5/2015 | Lallemant ........... F02B 29/0418 137/625.46 |

* cited by examiner

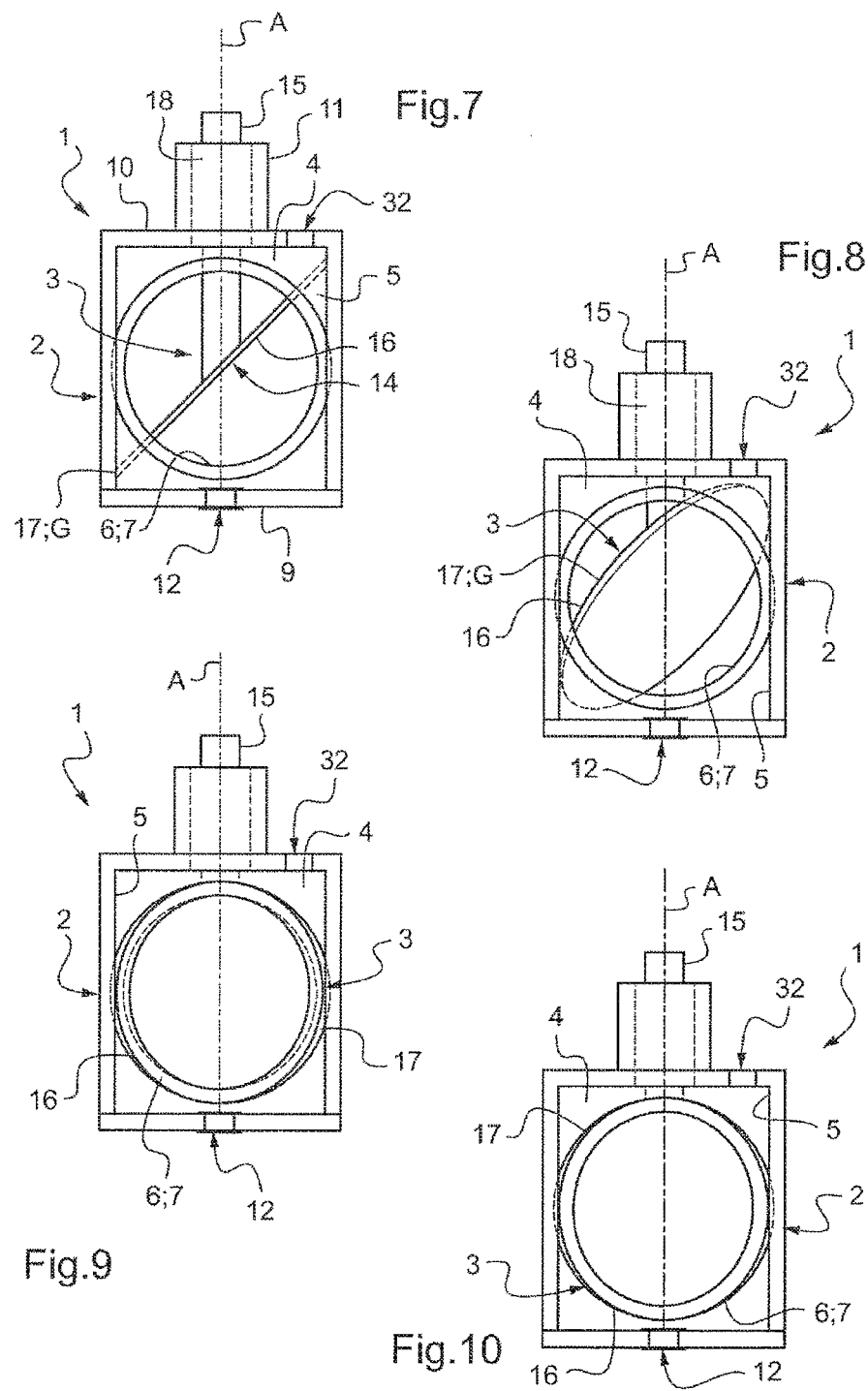

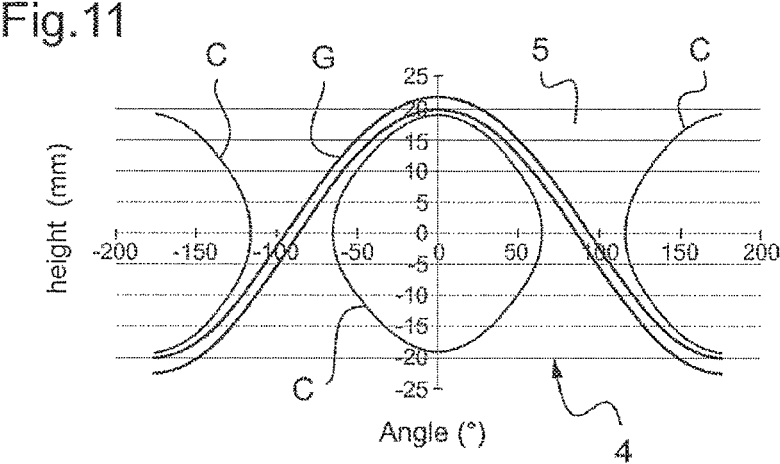
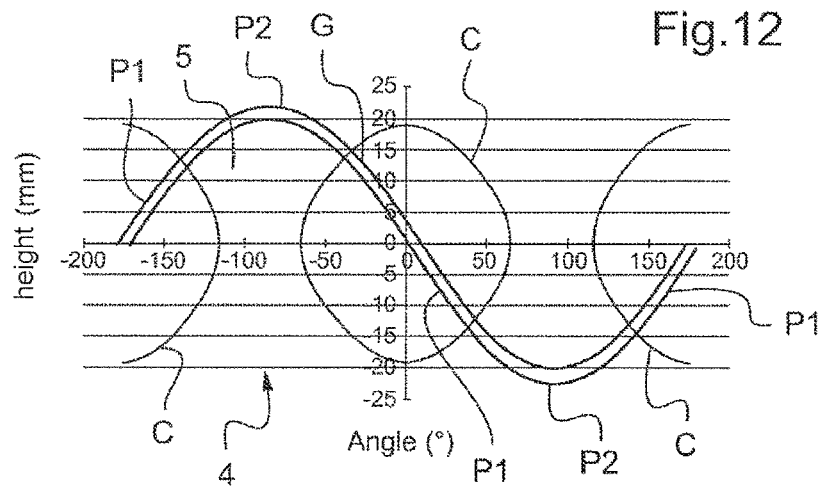

FLUID CIRCULATION VALVE, NOTABLY FOR A MOTOR VEHICLE, AND THERMAL CONDITIONING DEVICE COMPRISING SUCH A VALVE

The present invention relates to a fluid circulation valve designed more particularly but not exclusively to equip fluid circulation systems associated with internal combustion engines, whether petrol or Diesel, of vehicles, in particular motor vehicles.

Such valves may have various functions and, for example, when they are provided on Diesel turbocharged engines, they may be used to meter the quantity of air supplied to the intake line of the engine, or to divert a portion of the exhaust gases circulating in the exhaust line and to forward said gases in the direction of the intake line, in particular for the purpose of treating the nitrogen oxides. In this case, the gases are called recirculated exhaust gases. The valves according to the invention thus relate, in particular, to valves permitting the circulation of gas.

In recirculated exhaust gas circuits, it is known to use heat exchangers, called recirculated exhaust gas coolers, permitting the temperature of said gases to be lowered. However, in certain operating modes, it is not necessary to cool the exhaust gases. It is thus important to be able to circulate the gases to the intake line of the engine without passing via the heat exchanger. To this end, the recirculated exhaust gas circuits comprise a cooled line provided with the heat exchanger and a non-cooled line by-passing the cooled line.

Thus recirculated exhaust gas circuits are known, said circuits comprising a first valve permitting the quantity of recirculated exhaust gas to be metered and a second valve permitting the gas to be directed to the cooled line or to the non-cooled line. It is understood that such circuits have drawbacks in that they require two separate valves.

Moreover, the exhaust gas coolers are subject to fouling and it is important to be able to modify the direction of circulation of the exhaust gases inside the heat exchangers to limit this occurrence. However, such an operation requires additional actuators.

A similar situation is encountered in the intake lines of the engine. More specifically, in said intake lines, it is known to use charge air coolers. However, in certain operating modes, it is not necessary to cool the intake gases. It is thus important to be able to circulate the gases to the engine without passing via the cooler. To this end, the intake gas circuits comprise a cooled line provided with the charge air cooler and a non-cooled line, by-passing the cooled line.

Thus circuits for supplying air to the engine are known, said circuits comprising a first valve permitting the quantity of intake gas to be metered and a second valve permitting the gases to be directed to the cooled line or to the non-cooled line. It is understood that such circuits also have drawbacks in that they require two separate valves.

Moreover, with certain designs of engine, the intake gases comprise recirculated exhaust gases in addition to intake air. In the case where said gases are injected into the circuit upstream of the charge air cooler, said cooler risks being subject to fouling and it is important to be able to modify the direction of circulation of the intake gases inside charge air coolers to limit this occurrence. Here again, however, such an operation requires additional actuators.

The object of the present invention is to remedy these drawbacks and relates to a fluid circulation valve, notably for a motor vehicle, comprising a body and a sealing element able to occupy different angular positions by the rotation of said element relative to said body, said body having a first, a second, a third and a fourth inlet/outlet, said valve being configured so as to permit:

in a first of said angular positions, the circulation of the fluid from the first to the second inlet/outlet, in a second of said angular positions, the circulation of the fluid from the first to the third inlet/outlet and from the fourth to the second inlet/outlet, in a third of said angular positions, the circulation of the fluid from the first to the fourth inlet/outlet, and from the third to the second inlet/outlet.

In the first of said angular positions, the valve may be configured to permit the circulation of the fluid between the first, second, third and fourth inlets/outlets. In other words, the fluid may circulate freely from whichever inlet to whichever outlet.

The first of said angular positions may be an angular position belonging to an angular sector excluding at least the second and the third angular position.

In this manner, according to the invention, a valve is present providing numerous options for the circulation of fluid simply by the rotation of its sealing element.

According to different embodiments of the valve according to the invention which could be considered together or separately:

said sealing element has an angular path which is greater than 360°, said first and second inlets/outlets are radial, said third inlet/outlet is radial and axially offset relative to said first inlet/outlet toward an axial end of said body, said fourth inlet/outlet is radial and axially offset relative to said second inlet/outlet toward an axial end of said body, said third and fourth inlets/outlets are offset axially toward the opposing axial ends of said body, said third and/or fourth inlets/outlets are axial, said first and second inlets/outlets are in the extension of one another, said first and second inlets/outlets are of the same section, said first and second inlets/outlets are of greater section than said third and fourth inlets/outlets. Thus, in the first of said angular positions, the valve may be configured to permit the circulation of fluid principally from the first to the second inlet/outlet. The fluid circulates principally from the first to the second inlet/outlet when the flow rate of fluid circulating from the first inlet to the second outlet is greater than the flow rate of the other circulations.

According to one feature of the invention, said body comprises an internal cylindrical housing of circular cross section and said sealing element comprises at least one sealing part which is in particular elliptical, arranged in a plane which is inclined relative to said cylindrical housing and cooperating with the lateral wall of said housing by a peripheral generatrix, so as to ensure sealed contact between the sealing element and the body in at least one angular position.

Thus, according to this feature of the invention, a seal is obtained over the entire periphery of the flap in the angular positions isolating the first inlet/outlet from the second inlet/outlet, in particular in the second and third angular positions. The sealing part rotates over 360° and in the angular positions isolating the first inlet/outlet from the second inlet/outlet, ensures the seal with the lateral wall of the housing due to the continuous contact therebetween, provided by the incline of the sealing part with the wall of the housing, by which said sealing part has rotated in one or the other direction.

Preferably, said inclined part of the sealing element is shaped as a rotating disk, the peripheral edge thereof constituting the generatrix in contact with the lateral wall of the cylindrical housing, in particular so as to ensure a cylinder-to-cylinder contact. Thus, the projection of the inclined rotating disk along the rotational axis in the cylindrical housing is circular and the disk cooperates perfectly with the lateral wall thereof of corresponding section. It is noteworthy that the inclined sealing part is produced in a simple manner and, as mentioned above, this also permits leakages to be avoided in the positions of the disk isolating the first inlet/outlet from the second inlet/outlet.

The inclined sealing part forms, for example, an angle of substantially 45° with the axis of the cylindrical housing of the body.

Advantageously, said sealing element comprises a control rod which is connected to the inclined part to drive said inclined part in rotation and which is arranged in the axis of said cylindrical housing passing via the centre of said inclined part. Said rod thus simply bears the disk at the end, in such a manner that this embodiment of the sealing element dispenses with the shaft usually extending along the flap and causing difficulties with assembly and risks of leakage and interference associated with the offset.

More specifically, the flap is not in the plane of its rotating shaft, which reduces the interference between said two parts. Moreover, the flap, by its symmetry, may be mounted in either direction without having recourse to locating means.

In particular, said rod and said inclined part of the sealing element may be produced in one piece, or assembled fixedly to one another by overmolding, welding, bonding or by a fixing element, etc.

Preferably, on the side opposing the inclined sealing part, the rod is mounted in a guide bearing fixed to the body and/or is connected, at the outlet thereof, to a device for driving in rotation.

The invention also relates to a device for thermal conditioning of fluid comprising such a valve.

According to different embodiments of said device which could be considered together or separately:

said device further comprises a heat exchanger connected between said third and said fourth inlets/outlets in the region of a so-called cooled line, said device comprises a so-called non-cooled line, connected to said second inlet/outlet, said exchanger is configured so as to be a recirculated exhaust gas exchanger and said valve is configured so as to be a recirculated exhaust gas valve, said exchanger is configured so as to be a charge air cooler and said valve is configured so as to be an air metering valve.

Various embodiments of the invention will be described hereinafter with reference to the accompanying drawings which will make clear how the invention is able to be implemented. In these figures, identical reference numerals denote the same elements.

FIGS. 7 to 10 show respectively, in cross section, the positions of the sealing element in positions of 90°, 45°, 5°, placing in communication the first and second inlets/outlets, and in positions of 0° or 180°, isolating the first and second inlets/outlets, in the valve of FIG. 4.

FIGS. 11 and 12 show graphs, respectively showing the area of contact of the disk of the sealing element of the valve of FIG. 4, in the first angular position and in the second or third angular position, on the housing of the body of said aforementioned valve, illustrated in plan view.

Figure 1:
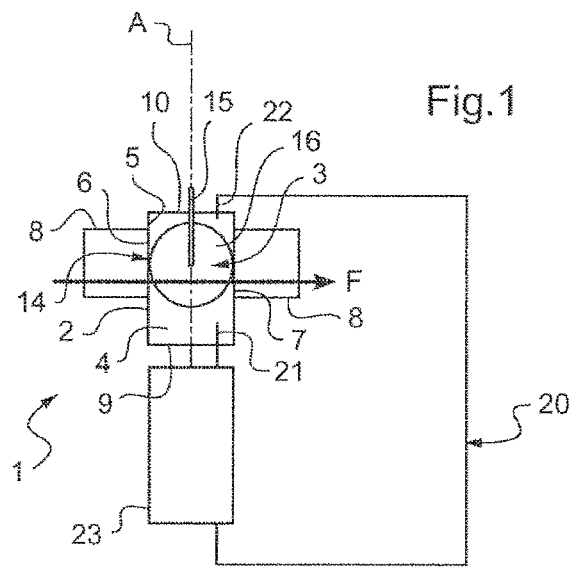
FIGS. 1, 2 and 3 are schematic views of a device for conditioning fluid comprising a valve, said device and said valve being in accordance with the invention, said valve being illustrated in three respective operating positions.
Figure 2:
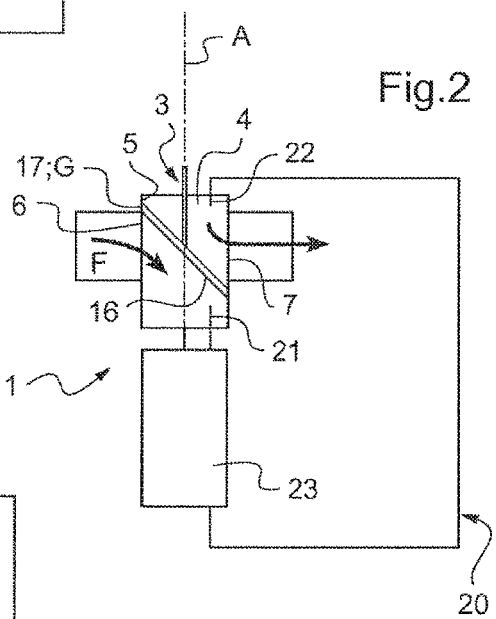
Figure 3:
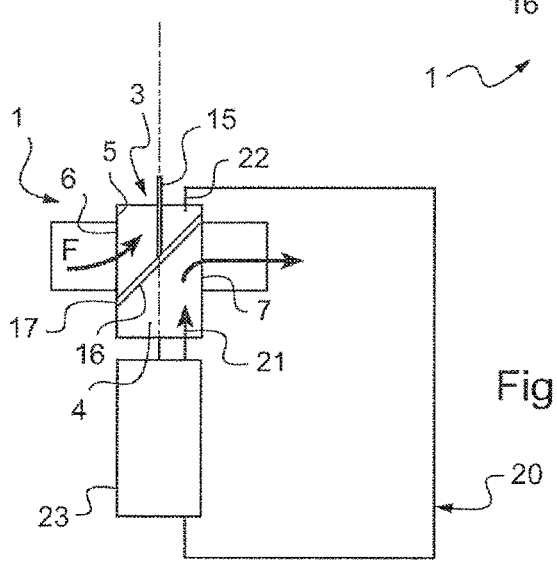

As illustrated in FIGS. 1 to 3, the fluid circulation valve 1 according to the invention comprises a body 2 and a sealing element 3 able to occupy different angular positions by the rotation of said sealing element 3 relative to said body 2.

The body 2 has in this case an internal housing 4, capable of being traversed by said fluid. The sealing element 3 is arranged in said internal housing 4.

Said body 2 has a first 6, a second 7, a third 21 and a fourth 22 inlet/outlet. Said first, second, third and fourth inlets/outlets are defined, for example, by orifices formed in said body 2 and discharging into the internal housing 4.

According to the invention, said valve is configured so as to permit:

in a first of said angular positions, illustrated in FIG. 1, the circulation of the fluid from the first 6 to the second 7 inlet/outlet, in a second of said angular positions, illustrated in FIG. 2, the circulation of the fluid from the first 6 to the third 21 inlet/outlet and from the fourth 22 to the second 7 inlet/outlet, according to the arrow referenced F.

in a third of said angular positions, illustrated in FIG. 3, the circulation of fluid from the first 6 to the fourth 22 inlet/outlet, and from the third 21 to the second 7 inlet/outlet.

In this case, it is noted that the first 6 and the second 7 inlets/outlets respectively define an inlet and an outlet, in each of the first, second and third angular positions of the valve, whilst the third 21 and the fourth 22 inlets/outlets alternatively define an inlet and an outlet for the fluid traversing the valve 1, in the second and third angular positions of the valve.

The internal housing 4 is cylindrical, having the axis A and being of circular section. This internal housing is defined by a lateral wall 5 of the body 2. Said internal housing may be likened to a bore. Here the inlet 6 and the outlet 7, forming a passage for the fluid designed to circulate through the housing 4 of the valve, discharge into the wall of said internal housing radially to the axis A. Said inlet 6 and outlet 7 are, for example, radial and aligned with one another. Said inlet and outlet have in this case a longitudinal axis X (FIG. 4) intersecting perpendicular to the axis A of the housing 4 and having identical diameters. They be extended beyond the lateral wall 5 of the housing by pipes 8 integrated in the body 2 and designed for the connection of said valve.

Moreover, it may be seen that the internal cylindrical housing 4 comprises a transverse base 9 at one of its ends, whilst a transverse cover 10 is located at its opposing end. Said cover is traversed by the sealing element 3 which cooperates with a driving device, not shown, controlled by a control unit known per se, to drive in rotation said sealing element 3 about the axis A.

Figure 4:
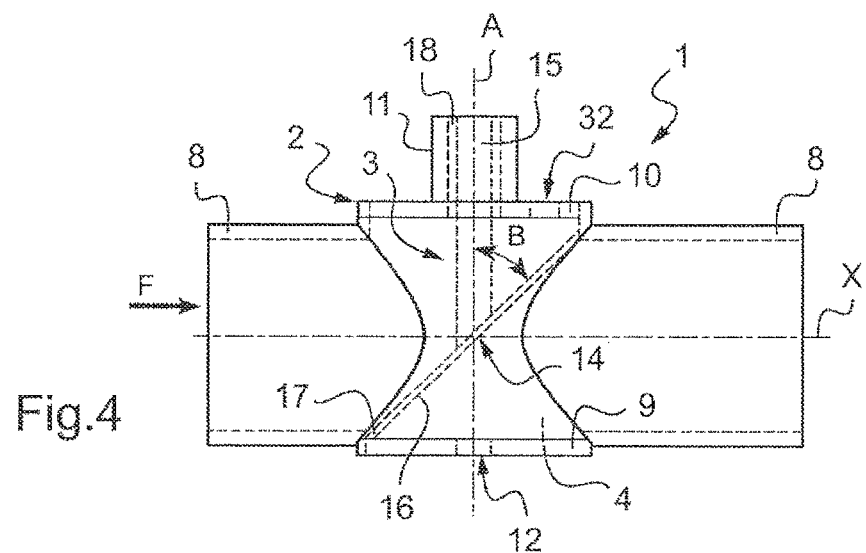
FIG. 4 is an external plan view of an embodiment of a valve according to the invention.

Said third inlet/outlet 21 could be axial and located, for example, in the transverse base 9, in particular in the region of an orifice 12 (FIG. 4).

Said fourth inlet/outlet 22 could be axial and located, for example, in the transverse cover 10, in particular in the region of an orifice 32 (FIG. 4).

As a variant, the third and/or fourth inlets/outlets could be radial and offset axially relative to the first 6 and second 7 inlets/outlets, for example respectively toward the base 9 and toward the cover 10.

Said first 6 and second 7 inlets/outlets are, for example, of greater section than said third and fourth inlets/outlets.

By the relative positioning of said first and second inlets/outlets 6, 7 relative to said third and fourth inlets/outlets 21, 22 and by the choice of their respective section, the circulation of the fluid is promoted from the inlet 6 to the outlet 7 in said first angular position.

Advantageously, said sealing element is configured so as to have an angular path which is greater than 360°. In other words, it could rotate on itself without angular limitation. Thus, it could return to its initial position by one complete revolution. It could also be configured to return to its initial position by a rotation in the opposite direction.

According to a first embodiment, not illustrated, said sealing element could comprise a cylindrical plug valve provided with passages for fluid, coming into correspondence, or not coming into correspondence, with the first, second, third and/or fourth inlets/outlets, depending on the different angular positions thereof.

According to a further embodiment corresponding to that illustrated, said sealing element 3 comprises at least one sealing part 14 arranged in a plane which is inclined relative to said cylindrical housing 4 and cooperating with the lateral wall 5 of said housing by a peripheral generatrix so as to ensure sealed contact between the sealing element 3 and the body 2 in at least one angular position.

Figure 5:
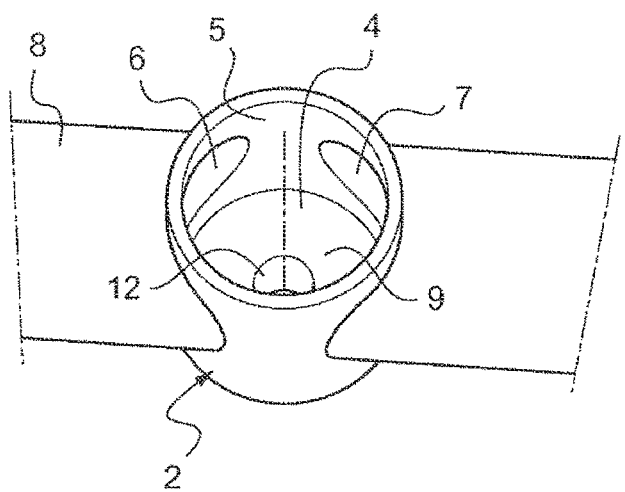
FIG. 5 shows, in perspective, the body of the valve of FIG. 4.
Figure 6:
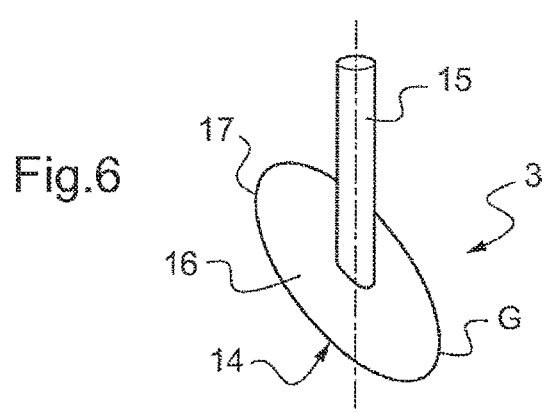
FIG. 6 shows, in perspective, the sealing element of the valve of FIG. 4.

As most clearly seen with reference to FIGS. 3 to 5, the inclined part 14 is shaped as an elliptical flap 16 arranged in a plane which is inclined relative to the axis A of the circular cylindrical housing 2 and centered on said axis A, so that its peripheral edge 17 is in constant contact with the lateral wall 5 of the housing 4 so as to isolate the inlet 6 and the outlet 7 in at least one given angular position of said sealing element, to place in direct fluidic communication, or not in direct fluidic communication, the inlet 6 and the outlet 7 with an adjustable flow rate, according to the angular position provided to the sealing flap. This peripheral edge 17 thus constitutes a generatrix G which is always in sealed contact with the lateral wall 5 of the housing in the angular positions where the inlet 6 and the outlet 7 are isolated from one another, in particular in the second and third angular positions.

By "inclined" is strictly understood to be between 0° and 90°. By "flap" is understood as a part having two inclined surfaces relative to the axis A and connected via the peripheral edge 17. Said inclined surfaces might be parallel to one another. The part has a small thickness, namely a distance between said inclined surfaces which is much less than the diameter of the body 2, in particular ten times less. It is, for example, a disk.

Geometric considerations are taken into account in order to ensure the correct functioning of the valve 1. The flap 16 has an elliptical shape having a large axis which is greater than the diameter of the circular housing 4 and having a small axis which is substantially less than the diameter of the circular housing 4. In this case, the diameter of the circular housing 4 is greater than the identical diameters of the inlet 6 and outlet 7 of fluid.

The sealing element 3 further comprises a connecting rod 15. Said connecting rod 15 is arranged along the axis A of the housing, such that it is centered on the inclined disk, with the angle B between the inclined plane of the disk and the axis A equal in this case to 45°. To achieve a constant contact with the lateral wall 5 of the housing, the large axis of the disk 16 is thus substantially equal to the diameter of the housing multiplied by √2. This contact may be defined as being a cylinder-to-cylinder contact between the wall 5 of circular section of the housing 4 and the generatrix G corresponding to the peripheral edge 17 of the inclined disk 16 and which is circular in projection on a plane perpendicular to the axis of rotation of the flap. The small axis of the flap 16 could be substantially greater than the diameter of the inlet 6 and outlet 7 of fluid.

It is noteworthy that the mounting of said sealing element 3 in the housing 4 of the body of the valve does not require any fine adjustment operation, and only the axial abutment of the means 3 in the housing is required in order to center the disk 16 relative to the inlet and outlet of the fluid.

The rod 15 is attached by one of its ends to the disk 16 by assembly or overmolding, or it is molded with the disk so as to achieve a one-piece sealing element 3. By way of example, the disk 16 may be made of plastics material and the rod 15 may be made of metal or vice versa, or the two elements may be made of plastics material or metal according to the one-piece design or selected composite. The other end of the rod passes through an axial hole of an end piece 11 of the cover 10, via a guide bearing 18. It is connected to the device for driving in rotation, not shown.

Illustrated in FIGS. 7 to 10 are different angular positions of the inclined disk 16.

In the position illustrated in FIG. 10, said inclined disk 16 of the sealing element 3 isolates the inlet 6 from the outlet 7 forcing the circulation of the fluid through the third and fourth inlets/outlets. To achieve this, it is seen that the peripheral edge 17 of the inclined disk 16 cooperates sealingly and completely with the lateral wall 5 of the cylindrical housing 4, in the manner of a partition separating the housing into two separate and sealed internal chambers, each partition facing one of the inlet 6 and outlet 7 channels for the passage of fluid. This angular position of the inclined disk 16 and thus of the sealing element 3 correspond to one or other of the second and third angular positions of the valve 1.

When the drive device is acted upon, it causes the rotation of said sealing element 3 according to the desired angle. With reference to FIG. 7, the sealing element 3, via its rod 15, has undergone a rotation of +/−90° about the axis A, whilst the inclined disk 16 has been rotated in the housing 4 so as to be located in a plane substantially parallel to the coaxial pipes 8 extending the inlet 6 and the outlet 7 of the body 2 of the valve. Following the rotation, the peripheral edge 17 is no longer in complete contact with the lateral wall 5 of the housing but only partially, since the opposing parts of the edge 17 are located opposite the circular inlets and outlets 6 and 7. This retracted angular position of the disk permits the passage of fluid between the inlet 6 and the outlet 7 via the sealed internal housing 4 of the body and corresponds to the first angular position of the valve 1.

An intermediate position of said sealing element 3 is illustrated by way of example with reference to FIG. 8, which position corresponds to a rotation of +/−45° of the inclined disk 16 about the axis A. The edge 17 of the disk is thus partially opposite the inlet 6 and the outlet 7, placing them in communication for the direct passage of fluid at an average flow rate, the remainder of the flow rate passing via the third 21 and fourth 22 inlet/outlets.

Regarding FIG. 9, this shows that the edge 17 of the inclined disk 16 is fully in contact with the lateral wall 5 of the housing when said sealing element is located approximately 5° from the initial closing position of 0°. This means that the complete overlap of the disk 16 and the housing 4 makes it possible to accept an angular error during assembly without reducing the level of sealing of the valve. The first angular position of the valve is finally obtained over an angular range of approximately 10° (+ or −5°).

It is also noteworthy that, due to the design of the inclined disk in a cylindrical housing with cylinder-to-cylinder contact, the different angular positions of the valve may be reached as noted above, either by continuous rotation or by reverse rotation of the sealing element. The sealing element may thus be advantageously used in either direction due to the fact that only its peripheral edge makes contact with the lateral wall of the housing.

The graphs of FIGS. 11 and 12 show clearly the position of the inclined disk 16 according to the height (mm) of the lateral wall 5 of the housing, which wall of 360° is developed from −180° to +180° so as to be shown in plan view.

In FIG. 11, the inclined disk 16 of said sealing element 3 occupies one of the second or third angular positions of the valve 1. Relative to the inlet 6 and the outlet 7, illustrated by the contour C of the pipes 8 delimiting said inlet and outlet, it is clearly seen that the peripheral edge 17 forming the generatrix G of the disk, shown in plan view along a sinusoidal path, is constantly in contact with the lateral wall 5 of the housing. In this manner, the inlet 6 and the outlet 7 are completely isolated from one another.

With reference to FIG. 12, the inclined disk 16 occupies the first angular position of the valve. In this case, it is clearly seen that the peripheral edge in the form of sinusoidal path (offset by Π/2 relative to FIG. 11) now primarily passes (reference P1) via the inlet and outlet 6 and 7, in the center thereof. Only the other part (reference P2) of the edge 17 remains in contact with the lateral wall 5 of the housing, which ensures the correspondence of the inlet 6 and outlet 7.

It is noteworthy that, as the edge of the disk is displaced in a linear manner on the cylindrical wall, this makes it possible to avoid fouling between the disk and the wall and to ensure self-cleaning of the valve.

If reference is made once again to FIGS. 1 to 3, it is observed that the invention also relates to a device for thermal conditioning of fluid comprising a valve as described above.

Said device further comprises a heat exchanger 23 connected between said third 21 and said fourth 22 inlets/outlets in the region of a so-called cooled line 20. The valve according to the invention thus permits a reversal of the direction of circulation of fluid in the exchanger between its second and third angular positions.

In this case, said device further comprises a so-called non-cooled line, connected to said second inlet/outlet 7. When the sealing element 3 is in its first angular position, the fluid passes directly from the inlet 6 to the outlet 7, without passing via the cooled line 20.

In this manner, the same flow rate is ensured through the valve 1 by carrying out an adjustment of the temperature of the fluid by metering the quantity of fluid conveyed into each of the cooled and non-cooled lines.

In other words, when the inclined disk 16 of said sealing element 3 is located in the fully open position illustrated with reference to FIG. 1, with its plane in the axis of the pipes 8 of the inlet 6 and the outlet 7, the fluid circulation flow F traverses the internal housing 4 of the valve 1 without passing via the cooling loop 20. In this manner, the fluid passing through the valve is not cooled.

As FIG. 2 shows, following the rotation by 90° in one direction about the axis A of the housing, the inclined disk 16 is located in a closed position, with its edge (generatrix G) in cylinder-to-cylinder contact over its entire periphery with the lateral wall 5 of the housing. In this manner, the fluid no longer communicates directly between the inlet 6 and the outlet 7, but leaves the inlet 6 to arrive in the housing 4 and to be directed, by closing the sealing disk, in the direction of the third inlet/outlet 21 of the valve 1 and passes through the loop 20 in the counterclockwise direction. The fluid thus traverses the cooler 23 where it is cooled and is then discharged via the fourth inlet/outlet 22 of the valve 1 to enter the housing 4 and then to pass via the outlet 7 of the valve.

In contrast, with reference to FIG. 3, the circulation of the fluid is carried out in the reverse direction from before, rotating said sealing element 3 by 90° in the other direction relative to the closed position of the FIG. 1. Once again in this position the inclined disk 16 ensures the closure of the valve 1. In this manner, the fluid passes through the cooling loop 20 in the clockwise direction, following the inlet 6, the housing 4, the fourth inlet/outlet 22, the loop 20, the third inlet/outlet 21, the housing 4 and then the outlet 7. Thus, the flow of fluid is reversed.

Different applications are conceivable. Said exchanger could be configured to be a recirculated exhaust gas exchanger and said valve could be a recirculated exhaust gas valve. As a variant, said exchanger could be configured to be a charge air cooler and said valve could be an air metering valve.

The invention claimed is:

1. A fluid circulation valve for a motor vehicle, comprising:
   a body; and
   a sealing element able to occupy different angular positions by the rotation of said element relative to said body,
   said body having a first, a second, a third and a fourth inlet/outlet,
   said valve being configured so as to permit:
      in a first of said angular positions, the circulation of the fluid from the first to the second inlet/outlet,
      in a second of said angular positions, the circulation of the fluid from the first to the third inlet/outlet and from the fourth to the second inlet/outlet, and
      in a third of said angular positions, the circulation of the fluid from the first to the fourth inlet/outlet and from the third to the second inlet/outlet,
   wherein said first and second inlets/outlets are radial, and said third and fourth inlets/outlets are axial.

2. The valve as claimed in claim 1, wherein said sealing element has an angular path which is greater than 360° C.

3. The valve as claimed in claim 1, wherein said body comprises an internal cylindrical housing of circular cross section, and said sealing element comprises at least one sealing part arranged in a plane which is inclined relative to said cylindrical housing and cooperating with the lateral wall of said housing by a peripheral generatrix, so as to ensure sealed contact between the sealing element and the body in at least one angular position.

4. The valve as claimed in claim 1, wherein said third inlet/outlet is axially offset relative to said first inlet/outlet toward an axial end of said body.

5. The valve as claimed in claim 1, wherein said fourth inlet/outlet is axially offset relative to said second inlet/outlet toward an axial end of said body.

6. The valve as claimed in claim 1, wherein said third and fourth inlets/outlets are offset axially toward the opposing axial ends of said body.

7. The valve as claimed in claim 1, wherein said first and second inlets/outlets are of greater section than said third and fourth inlets/outlets.

8. The valve as claimed in claim 1, wherein said first and second inlets/outlets are an extension of one another.

9. The valve as claimed in claim 1, wherein said first and second inlets/outlets are of the same section.

10. A device for thermal conditioning of fluid comprising a valve as claimed in claim 1.

11. The device as claimed in claim 10, further comprising a heat exchanger connected between said third and said fourth inlets/outlets in the region of a so-called cooled line.

12. The device as claimed in claim 11, further comprising a non-cooled line, connected to said second inlet/outlet.

13. The device as claimed in claim 11, wherein one of
said exchanger is configured so as to be a recirculated exhaust gas exchanger and said valve is configured so as to be a recirculated exhaust gas valve, or
said exchanger is configured so as to be a charge air cooler and said valve is configured so as to be an air metering valve.

14. A fluid circulation valve for a motor vehicle, comprising:
a body; and
a sealing element able to occupy different angular positions by the rotation of said element relative to said body, wherein
said body comprises an internal cylindrical housing of circular cross section, and said sealing element comprises at least one sealing part arranged in a plane which is inclined relative to said internal cylindrical housing and cooperating with the lateral wall of said housing by a peripheral generatrix, so as to ensure sealed contact between the sealing element and the body in at least one angular position,
said body has a first, a second, a third and a fourth inlet/outlet, and
said valve is configured so as to permit:
in a first of said angular positions, the circulation of the fluid from the first to the second inlet/outlet,
in a second of said angular positions, the circulation of the fluid from the first to the third inlet/outlet and from the fourth to the second inlet/outlet, and
in a third of said angular positions, the circulation of the fluid from the first to the fourth inlet/outlet and from the third to the second inlet/outlet.

* * * * *